United States Patent Office 3,778,284
Patented Dec. 11, 1973

3,778,284
METHOD OF MANUFACTURING A BINDER IN A VARNISH FOR VARNISHING ELECTROPLATES
Carl-Artur Akerblom, Surahammar, Sweden, assignor to Allmanna Svenska Elektriska Aktiebolaget, Vasteras, Sweden
No Drawing. Filed Dec. 16, 1971, Ser. No. 208,883
Claims priority, application Sweden, Dec. 21, 1970, 17,261/70
Int. Cl. C08b 25/00
U.S. Cl. 106—162                    10 Claims

ABSTRACT OF THE DISCLOSURE

Electrical steel sheet is varnished with a varnish produced by oxidizing a carbohydrate so that carboxyl groups are formed in the molecule and adding furfural to the oxidized carbohydrate.

BACKGROUND OF THE INVENTION

(1) Field of the invention

The invention relates to a method of manufacturing a binder in a varnish for varnishing electrical steel sheets, to the varnish so produced and to steel sheets varnished with the varnish.

(2) The prior art

The properties of the varnish used for varnishing electrical steel sheets are of considerable importance for the wear of tools employed for punching the plates. Particularly heavy wear on tools is caused by electrical steel sheets which are coated with a hard varnish, e.g. sheets coated with a heat-treated layer of varnish consisting for the main part of sulphite cellulose waste liquor. Varnishes based on sulphite cellulose waste liquor (for example the varnish described in British patent specification No. 664,590) are otherwise well suited for the electrical insulation of electroplates, since they provide a layer of varnish which adheres well to the sheet and is not damaged during the punching, which would damage the insulation. Consequently, such varnishes are widely used and various methods have been proposed for modifying sulphite cellulose waste liquor in order to avoid their disadvantage of causing considerable wear on punch tools. Up to the present, however, it has been impossible to achieve low wear of the punch tools and a varnish layer which remains intact during punching.

SUMMARY OF THE INVENTION

According to the present invention, however, it has proved possible to produce varnishes which, when used for varnishing electrical sheets give a sheet having excellent punching properties. The use of these varnishes results in the wear on the punching tool being extremely low and at the same time the layer of varnish remains intact on the piece which is punched out and is not damaged at the edges coming into contact with the punching tool. Another extremely important property of a varnish manufactured in accordance with the invention is its good resistance to heat which greatly facilitates the welding to stator and rotor stacks as well as embedment by casting. Furthermore, the varnish layer has good electrically insulating resistance and very low dusting tendency.

Since water can be used as the solvent in the varnish, manufacture of electrical sheets coated with the varnish is simplified, for example the curing of the varnish when it is applied on the sheet.

The present invention relates to a method of manufacturing a binder in a varnish for varnishing electrical steel sheets, characterised in that carbohydrate is oxidized so that carboxyl groups are formed in the molecule and furfural is added.

A possible explanation of the greatly improved result obtained upon varnishing electrical sheets with a varnish according to the present invention is that the carboxyl compounds formed upon the oxidation of the carbohydrates contribute to the formation of large molecules when the varnish is applied on the sheet, due to condensation with hydroxyl groups, and also react with oxides on the surface of the plates, thus giving better adhesion of the varnish to the sheet.

Examples of carbohydrates which can be used for manufacturing the varnish are monosaccharides such as pentoses and hexoses, for example arabinose, xylose, glucose, fructose, mannose and galactose, disaccharides, for example saccharose, maltose, lactose, cellubiose, sorbose, gentiobiose, trehalose and melibiose, polysaccharides, that is sacchardies having more than 12 carbon atoms, for example starch and cellulose as well as industrial waste products, for example molasses and sulphite cellulose waste liquor which contain carbohydrates or are built up of carbohydrates which can be released by means of hydrolysis. The carbohydrate may even consist of mixtures of two or more different carbohydrates.

If the carbohydrates consist of long carbon chains, for instance having more than 12 carbon atoms, as is the case with starch for instance, it is suitable to hydrolyze them by treating them in a strongly concentrated water solution with acid, for example phosphoric acid. The hydrolysis may be performed before, during or after the oxidaiton.

If the carbohydrates are components in industrial waste products which during their manufacture have been in acid surroundings, or if they comprise carbon chains having at most 12 carbon atoms, it is suitable to use them as such without creating opportunities for hydrolysis. In certain cases, however, it may also be advantageous to carry out hydrolysis on a disaccharide.

According to the invention 0.03–1 part by weight, preferably 0.05–0.35 part by weight, furfural is used per part by weight carbohydrate.

Oxidation may be performed using for instance chromic acid, chromates, nitric acid, hydrogen peroxide and other peroxides, for example barium peroixde and ammonium persulphate, permanganates, metal ions, for example cupric and ferric ions, chloric acid and chlorates. The oxidant should be selected so that oxidation results in the formation of carboxyl groups in the carbohydrate molecule. The number of carboxyl groups should be such that on the average there is at least one carboxyl group on every fourth carbohydrate molecule and preferably such that on average there is at least one carboxyl group on every second carbohydrate molecule. To a ceratin extent the oxidation may result in splitting of the molecule, as in the case of ketone groups occurring in ketoses, in connection with the formation of the carboxyl groups. The quantity of oxidant is adjusted so that there is no splitting of the carbohydrate molecules except possibly at those points where there are ketone groups.

It has been found advantageous to incorporate a phosphate of earth alkali metal, such as magnesium or calcium phosphate, or of aluminium in the binder. Suitably 0.03–1 part by weight, preferably 0.3–0.8 part by weight phosphate, is used per part by weight carbohydrate. The addition of phosphate increases the insulating resistance and makes the varnish harder, thus preventing cold flow and sticking of sheets stacked on top of each other—something which otherwise may occur with electrical sheets varnished with organic varnishes. Metaphosphates and monoorthophosphates are suitable for use, the latter being converted to metaphosphates when the varnish is applied on the electrical steel sheets and during the heat treatment.

Small quantities of other organic substances may also be included in the varnish, for example organic substances such as lignin derivatives which are constituents of sulphite cellulose waste liquor together with carbohydrates.

Since water can be used as the solvent, and has all advantages as such, there is no reason to use any other solvent. In fact it would be possible to use other solvents in which carbohydrates and furfural are soluble, for example lower alcohols of the ethanol, methanol, glycol and glycerine type. The use of the latter two substances as well as water for the solvent may be advantageous in certain cases since, for instance, it produces more uniform evaporation of the solvent.

The quantity of water is adjusted according to the method used for applying the varnish on the sheets and according to the thickness of the layer of varnish desired when finished.

When the varnish has been applied, the sheet is subjected to a heat treatment of at least 260° C., preferably 260–440° C., for about one minute. Temperatures above 600° C. should be avoided as these may cause a deterioration of the adhesion of the varnish to the sheet.

The varnish is suitably applied in a quantity which produces a finished layer having a thickness of 0.5–5$\mu$, preferably 0.5–3$\mu$.

The varnish is manufactured most simply by mixing the carbohydrate with the oxidant at ambient temperature. Since the oxidation is an exothermic reaction, the temperature increases some tens of degrees in any case. When phosphate is used this is also mixed with the materials mentioned. The furfural is then added to the mixture, as well as a small quantity of wetting agent. No heat is necessary to dissolve the furfural and the wetting agent.

DESCRIPTION OF THE PREFERRED EMBODIMENT

The invention will now be described in greater detail in the following examples.

EXAMPLE 1

10 parts by weight calcium metaphosphate dissolved or suspended in 30 parts by weight water, 12 parts dried sulphite cellulose waste liquor (for example Totanin from As Poulsson & Son, Oslo, Norway which substance consists essentially of carbohydrate and also contains lignin derivatives) and 1.1 part by weight $CrO_3$ dissolved in 1 part by weight water are mixed at ambient temperature. The exothermic oxidation reaction which then takes place increases the temperature of the mixture to about 60° C. 1.2 parts by weight furfural and 0.1 part by weight of a wetting agent (for example under the trademark Teepol, Shell, or the trademark V105, ICI) are mixed in without the composite mixture being heated.

The varnish obtained in this way is applied on the sheet to be insulated by pressure-rolling, and then cured at a temperature of about 300° C. for 30–60 seconds. The thickness of the layer of varnish is then 1.5$\mu$. If the varnish is applied with corrugated rolls, it is first diluted with 50 parts by weight water. Irrespective of the method of application, the thickness of the layer of varnish can be regulated by altering the water content of the varnish.

EXAMPLE 2

A mixture is prepared of 55 parts by weight 85% (percent by weight) orthophosphoric acid, 6 parts by weight magnesium oxide and 100 parts by weight water. A solution of magnesium monoorthophosphate is thus obtained. To this solution which becomes warm are added 20 parts by weight dried sulphite cellulose waste liquor and 1 part by weight $CrO_3$ dissolved in 1 part by weight water, while the phosphate solution is still hot. The temperature of the mixture will then be around 80° C. After cooling 2 parts by weight furfural and 0.1 part by weight wetting agent of the type mentioned in Example 1 are added to the mixture.

The varnish obtained is applied in the manner indicated in Example 1.

EXAMPLE 3

A mixture is prepared of 55 parts by weight 85% (percent by weight) orthophosphoric acid, 16 parts by weight calcium carbonate and 300 parts by weight water. A solution of calcium monoorthophosphate is thus obtained. To this solution are added 25 parts by weight saccarose and 1 part by weight $CrO_3$ dissolved in 1 part by weight water, while the phosphate solution is still hot. After cooling, 2 parts by weight furfural and 0.1 part by weight wetting agent of the type mentioned in Example 1 are added to the mixture.

The varnish obtained is applied with corrugated rolls under the conditions described in Example 1.

EXAMPLE 4

A mixture is prepared of 55 parts by weight 85% (percent by weight) orthophosphoric acid, 3 parts by weight magnesium oxide, 10 parts by weight crystallised aluminum sulphate and 60 parts by weight water. To this solution are added 16 parts by weight molasses and 1 part by weight chromic acid dissolved in 1 part by weight water, while the phosphate solution is still hot. After cooling, 1.5 parts by weight furfural and 0.1 part by weight wetting agent of the type mentioned in Example 1 are added.

The varnish obtained is applied in the manner indicated in Example 1.

EXAMPLE 5

10 parts by weight calcium methphosphate dissolved or suspended in 30 parts by weight water, 25 parts by weight saccarose and 1 part by weight $CrO_3$ dissolved in 1 part by weight water are mixed at ambient temperature. 1.2 parts by weight furfural and 0.1 part by weight wetting agent of the type mentioned in Example 1 are then added to the hot mixture thus produced.

The varnish obtained is applied in the manner indicated in Example 1.

EXAMPLE 6

A mixture is prepared of 55 parts by weight 85% (percent by weight) orthophosphoric acid, 16 parts by weight calcium carbonate and 300 parts by weight water. A solution of calcium monorothophosphate is thus obtained. To this solution are added 25 parts by weight glucose and 2.5 parts by weight 30% hydrogen peroxide aqueous solution, while the phosphate solution is still hot. After cooling, 2 parts by weight furfural and 0.1 part by weight wetting agent of the type mentioned in Example 1 are added to the mixture.

The varnish obtained is applied with corrugated rolls under the conditions described in Example 1.

I claim:

1. Method of manufacturing a binder in a varnish for varnishing electrical steel sheets, which comprises oxidizing a carbohydrate so that carboxyl groups are formed in the molecule and adding at least 0.3 part (meaning part by weight) furfural per part of carbohydrate to the oxidized carbohydrate, in which said carbohydrate consists essentially of at least one carbohydrate having more than 12 carbon atoms and the carbohydrate is hydrolyzed.

2. Method of manufacturing a binder in a varnish for varnishing electrical steel sheets, which comprises oxidizing a carbohydrate so that carboxyl groups are formed in the molecule and adding at least 0.3 part (meaning part by weight) furfural per part of carbohydrate to the oxidized carbohydrate, in which a phosphate of at least one substance selected from the group of earth alkali metals and aluminum is incorporated in the binder.

3. Method according to claim 2, in which 0.03–1 part by weight phosphate is used to 1 part by weight carbohydrate.

4. Electrical steel sheet varnished with a varnish consisting essentially of a solution of carbohydrate oxidized to contain carboxyl groups in the molecule and at least 0.3 part by weight furfural per part of carbohydrate.

5. Electrical steel sheet according to claim 4, in which the varnish is applied in a quantity producing a finished coating having a thickness of 0.5–5 microns.

6. A method of coating electrical steel sheet which comprises applying to the sheet a varnish consisting essentially of a solution of a carbohydrate oxidized to contain carboxyl groups and at least 0.3 part by weight furfural per part of carbohydrate and heating the sheet with the varnish applied thereon to a temperature of at least 260° C.

7. A method as claimed in claim 6, in which the quantity of varnish is such as to produce the finished coating of a thickness of 0.5–5 microns.

8. Method according to claim 6, in which the carbohydrate consists essentially of a cabohydrate having at the most 12 carbon atoms.

9. Method according to claim 6, in which carbohydrate consists essentially of at least one substrate selected from the group monosaccharides and disaccharides.

10. Method according to claim 6, in which the carbohydrate consists essentially of a hydrolysis product of a carbohydrate having more than 12 carbon atoms.

References Cited
UNITED STATES PATENTS
| | | | |
|---|---|---|---|
| 2,153,316 | 4/1939 | Sherrard | 260—67 F |
| 2,755,204 | 7/1956 | Carter | 260—67 F |

OTHER REFERENCES
Chem. Abst., vol. 57: 3709b, 1962.
Biochemistry, West & Todd, 1966, pp. 205–206.

THEODORE MORRIS, Primary Examiner

U.S. Cl. X.R.

106—123, 213; 117—127

UNITED STATES PATENT OFFICE
CERTIFICATE OF CORRECTION

Patent No. 3,778,284                    Dated December 11, 1973

Inventor(s) Carl-Artur Akerblom

It is certified that error appears in the above-identified patent and that said Letters Patent are hereby corrected as shown below:

Change as follows:

In claim 1, line 4; claim 2, line 4; claim 4, line 3; and claim 6, line 4, change "0.3" to read -- 0.03 --.

Signed and sealed this 16th day of April 1974.

(SEAL)
Attest:

EDWARD M. FLETCHER, JR.
Attesting Officer

C. MARSHALL DANN
Commissioner of Patents